United States Patent Office.

THOMAS JOHNSON, OF TEWKSBURY, ASSIGNOR TO HIMSELF AND JAMES S. HUTCHINSON, OF LAWRENCE, MASSACHUSETTS.

Letters Patent No. 82,120, dated September 15, 1868.

IMPROVED COMPOSITION FOR SIZING OR DRESSING WARPS.

The Schedule referred to in these Letters Patent and making part of the same.

TO ALL PERSONS TO WHOM THESE PRESENTS MAY COME:

Be it known that I, THOMAS JOHNSON, of Tewksbury, in the county of Middlesex, and State of Massachusetts, have invented a new and useful Composition for Sizing or Dressing Warps or other articles or fabrics; and do hereby declare the same, and the manner of compounding it, to be fully described as follows:

In making the said composition, I take one gallon of water, two and one-half pounds of raw hide, and three ounces of chloride of sodium, or common salt.

These materials I put in a kettle or vessel, and boil the water until the salt and the raw hide are dissolved thereby. This having been done, the whole should be strained through a woollen or other cloth, and there should be added to it one ounce and one-half of alum, which may be previously dissolved in water.

After this the compound may be boiled steadily for about five minutes. After having been allowed to cool, it will be ready for use.

It will be practically inodorous. It will withstand the friction of the reed of the loom while the warps are being woven, and is superior to glue or any of the compositions generally used for sizing or dressing warps.

It is also useful for other purposes, particularly as a glaze for cloth.

I do not confine my invention or compound to the precise proportions of its ingredients, as hereinbefore explained, as such may be somewhat varied without materially affecting the result.

I have found that by dissolving, in one gallon of water, six ounces of salt and three ounces of alum, and afterwards introducing into the solution the quantity of raw hide, and allowing it to remain therein seven days, or about that time, the hide will be better prepared for being dissolved in manner and by the means as hereinbefore stated. It will be dissolved in about one-fourth of the time, and I am enabled to dissolve double the quantity of the hide, that is, five pounds of it in one gallon of water and three ounces of the salt, the one and one-half ounce of alum being afterwards added.

I claim the above-described composition as composed of the before-mentioned ingredients, combined by means of water and heat, in manner substantially as specified.

THOMAS JOHNSON.

Witnesses:
R. H. EDDY,
F. P. HALE, Jr.